(12) United States Patent
Noguchi et al.

(10) Patent No.: US 12,583,117 B2
(45) Date of Patent: Mar. 24, 2026

(54) WORKPIECE PROCESSING APPARATUS

(71) Applicant: FUJI CORPORATION, Chiryu (JP)

(72) Inventors: Shuhei Noguchi, Toyota (JP);
Toshitaka Fukunaga, Toyota (JP);
Yosuke Futamura, Toyota (JP)

(73) Assignee: FUJI CORPORATION, Chiryu (JP)

( * ) Notice: Subject to any disclaimer, the term of this
patent is extended or adjusted under 35
U.S.C. 154(b) by 252 days.

(21) Appl. No.: 18/249,399

(22) PCT Filed: Dec. 18, 2020

(86) PCT No.: PCT/JP2020/047382
§ 371 (c)(1),
(2) Date: Apr. 18, 2023

(87) PCT Pub. No.: WO2022/130608
PCT Pub. Date: Jun. 23, 2022

(65) Prior Publication Data
US 2023/0381968 A1 Nov. 30, 2023

(51) Int. Cl.
B25J 9/16 (2006.01)

(52) U.S. Cl.
CPC .......... B25J 9/1682 (2013.01); B25J 9/1628
(2013.01); B25J 9/1664 (2013.01)

(58) Field of Classification Search
CPC . B25J 9/1682; B25J 9/1628; B25J 9/16; B25J
9/0084; B25J 9/026; G05B 2219/40252
See application file for complete search history.

(56) References Cited

U.S. PATENT DOCUMENTS 5,634,565 A * 6/1997 Lesage .................. B66C 15/045
104/301
2001/0023377 A1* 9/2001 Wehrung ........... G05B 19/4189
700/230

(Continued)

FOREIGN PATENT DOCUMENTS

EP 3152712 A2 * 4/2017 .............. B60L 58/12
JP H0283195 A * 3/1990

(Continued)

OTHER PUBLICATIONS

International Search Report mailed on Mar. 16, 2021 in PCT/JP2020/
047382 filed on Dec. 18, 2020 (2 pages).

*Primary Examiner* — Truc M Do
*Assistant Examiner* — Tyler Roger Robarge
(74) *Attorney, Agent, or Firm* — Oblon, McClelland,
Maier & Neustadt, L.L.P.

(57) ABSTRACT

A workpiece processing apparatus includes two workpiece
conveyance robots capable of traveling on the same travel-
ing table and capable of carrying a workpiece into and out
of a processing section, and a control device for performing
movement control of the workpiece conveyance robot. The
two workpiece conveyance robots include a first robot and
a second robot. The control device includes a first determi-
nation section configured to determine, from a first differ-
ence between a first robot next instruction value which is an
instruction value related to a movement control instruction
issued to the first robot immediately after a time when a
determination as to whether the first robot starts the traveling
starts and indicates a movement destination position of the
first robot and a second robot movement destination position
which is a value related to a movement control instruction
executed by the second robot at the time when the determi-
nation starts and indicates a movement destination position (Continued)

of the second robot, movability of the first robot by the movement control instruction.

5 Claims, 16 Drawing Sheets

(56)                     References Cited

U.S. PATENT DOCUMENTS

| | | | | |
|---|---|---|---|---|
| 2004/0111339 A1* | 6/2004 | Wehrung | ............... | G06Q 40/12 |
| | | | | 705/30 |
| 2005/0273200 A1* | 12/2005 | Hietmann | .............. | B25J 9/1666 |
| | | | | 700/248 |
| 2009/0204258 A1* | 8/2009 | Tao | ........................ | B25J 9/1674 |
| | | | | 700/248 |
| 2015/0284010 A1* | 10/2015 | Beardsley | ................ | G08G 5/57 |
| | | | | 701/1 |
| 2018/0029233 A1* | 2/2018 | Lager | ..................... | B25J 9/1676 |
| 2019/0092578 A1* | 3/2019 | Umeyama | ............... | B60L 13/03 |
| 2020/0012268 A1* | 1/2020 | Stadie | .................... | G05D 1/693 |
| 2020/0064811 A1* | 2/2020 | Spieker | ................. | B25J 9/1676 |

FOREIGN PATENT DOCUMENTS

| | | | | | | |
|---|---|---|---|---|---|---|
| JP | H0283196 A | * | 3/1990 | | | |
| JP | 07271415 A | * | 10/1995 | | | |
| JP | 8-57738 A | | 3/1996 | | | |
| JP | H0857738 A | * | 3/1996 | | | |
| JP | 2019-98511 A | | 6/2019 | | | |
| JP | 2019098511 A | * | 6/2019 | .............. | B23Q 7/16 |

* cited by examiner

FIG. 4

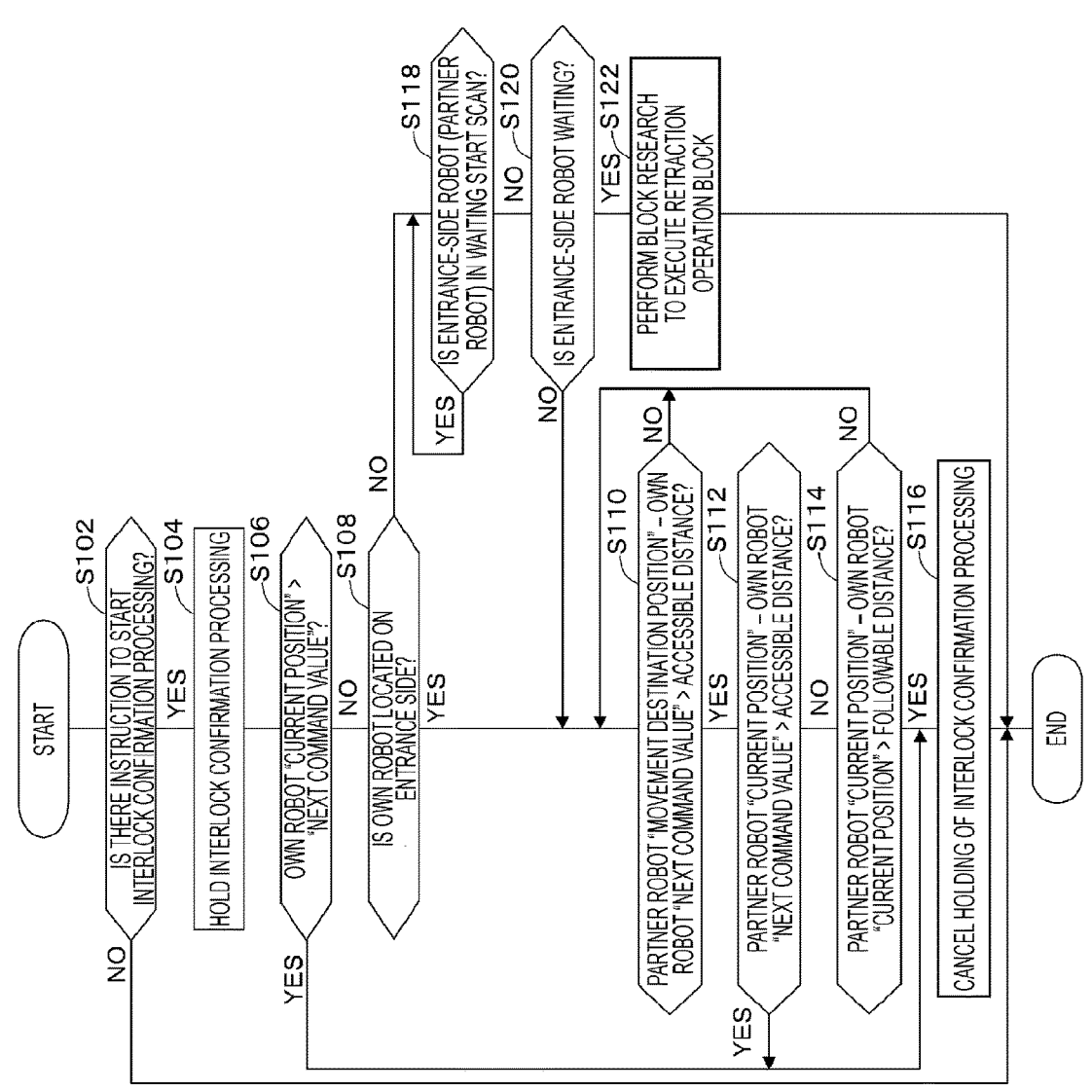

START

S102 — IS THERE INSTRUCTION TO START INTERLOCK CONFIRMATION PROCESSING?

NO

YES

S104 — HOLD INTERLOCK CONFIRMATION PROCESSING

S106 — OWN ROBOT "CURRENT POSITION" > "NEXT COMMAND VALUE"?

NO

YES

S108 — IS OWN ROBOT LOCATED ON ENTRANCE SIDE?

NO

YES

S118 — IS ENTRANCE-SIDE ROBOT (PARTNER ROBOT) IN WAITING START SCAN?

YES

NO

S120 — IS ENTRANCE-SIDE ROBOT WAITING?

YES

NO

S122 — PERFORM BLOCK RESEARCH TO EXECUTE RETRACTION OPERATION BLOCK

S110 — PARTNER ROBOT "MOVEMENT DESTINATION POSITION" – OWN ROBOT "NEXT COMMAND VALUE" > ACCESSIBLE DISTANCE?

NO

YES

S112 — PARTNER ROBOT "CURRENT POSITION" – OWN ROBOT "NEXT COMMAND VALUE" > ACCESSIBLE DISTANCE?

YES

NO

S114 — PARTNER ROBOT "CURRENT POSITION" – OWN ROBOT "CURRENT POSITION" > FOLLOWABLE DISTANCE?

NO

YES

S116 — CANCEL HOLDING OF INTERLOCK CONFIRMATION PROCESSING

END

CASE 1

OWN ROBOT NEXT
COMMAND VALUE     OWN ROBOT
CURRENT POSITION     PARTNER ROBOT
CURRENT POSITION

PARTNER ROBOT:
DURING WAITING

OWN ROBOT:
DURING PRIORITY
DETERMINATION 40b     40a     41b

OWN ROBOT NEXT
COMMAND VALUE     PARTNER ROBOT
CURRENT POSITION     OWN ROBOT
CURRENT POSITION     PARTNER ROBOT NEXT
COMMAND VALUE

CASE 2-1

OWN ROBOT
CURRENT POSITION

OWN ROBOT NEXT
COMMAND VALUE

PARTNER ROBOT CURRENT POSITION
(PARTNER ROBOT MOVEMENT
DESTINATION POSITION)

CASE 2-2

CASE 2-3

OWN ROBOT
CURRENT POSITION

PARTNER ROBOT
CURRENT POSITION

OWN ROBOT NEXT
COMMAND VALUE

PARTNER ROBOT MOVEMENT
DESTINATION POSITION

CASE 2-4

40a          40b          41b

OWN ROBOT
CURRENT POSITION

PARTNER ROBOT
CURRENT POSITION

PARTNER ROBOT MOVEMENT    OWN ROBOT NEXT
DESTINATION POSITION      COMMAND VALUE

CASE 3-1

OWN ROBOT
CURRENT POSITION

PARTNER ROBOT
CURRENT POSITION

OWN ROBOT NEXT
COMMAND VALUE

CASE 3-2

OWN ROBOT
CURRENT POSITION

PARTNER ROBOT
CURRENT POSITION

PARTNER ROBOT MOVEMENT
DESTINATION POSITION

OWN ROBOT NEXT
COMMAND VALUE

CASE 3-3

CASE 3-4

OWN ROBOT
CURRENT POSITION

PARTNER ROBOT
CURRENT POSITION

FOLLOWABLE
DISTANCE

OWN ROBOT NEXT
COMMAND VALUE

PARTNER ROBOT
MOVEMENT
DESTINATION
POSITION

WORKPIECE PROCESSING APPARATUS

TECHNICAL FIELD

The present specification relates to a workpiece processing apparatus.

BACKGROUND ART

As a form of a workpiece processing apparatus, Patent Literature 1 discloses a workpiece processing apparatus in which multiple robots (loaders) each for delivering a workpiece to and from a machine tool are installed so as to be traveled on the same traveling table (rail), and a control device (loader control device) for independently moving and controlling each robot is provided. In this workpiece processing apparatus, the control device performs proximity speed control for forcibly changing a speed when a relative distance becomes equal to or less than a reference value, based on the relative distance between adjacent robots obtained from coordinate values of the individual robots.

PATENT LITERATURE

Patent Literature 1: JP-A-H08-057738

BRIEF SUMMARY

Technical Problem

In the workpiece processing apparatus described in Patent Literature 1 described above, although it is possible to suppress collisions between robots installed on the same traveling table as much as possible, it is demanded to further suppress collisions between robots.

In view of such a circumstance, the present specification discloses a workpiece processing apparatus capable of further suppressing collisions between robots installed on the same traveling table.

Solution to Problem

According to an aspect of the present specification, there is provided a workpiece processing apparatus including: two workpiece conveyance robots configured to travel on the same traveling table and carry a workpiece into and out of a processing section; and a control device configured to perform movement control of the workpiece conveyance robot, in which the two workpiece conveyance robots include a first robot and a second robot, and the control device includes a first determination section configured to determine, from a first difference between a first robot next instruction value which is an instruction value related to a movement control instruction issued to the first robot immediately after a time when a determination as to whether the first robot starts the traveling starts and indicates a movement destination position of the first robot and a second robot movement destination position which is a value related to a movement control instruction executed by the second robot at the time when the determination starts and indicates a movement destination position of the second robot, movability of the first robot by the movement control instruction.

Advantageous Effects

According to the present disclosure, at the time when the determination as to the movability of the first robot, by using the first difference between the movement destination position of the second robot by the movement control instruction executed at that time and the movement destination position of the first robot by the movement control instruction (the movement control instruction that will be executed at the highest speed (shortest) at that time) executed next to the movement control instruction executed at that time, it is possible to more precisely and accurately determine the movability of the first robot. In addition, it is possible to appropriately perform the movement control of the first robot based on the determination result, and as a result, it is possible to further suppress collision between robots installed on the same traveling table.

BRIEF DESCRIPTION OF DRAWINGS

FIG. 4 is a flowchart illustrating a program executed by control device 50 illustrated in FIG. 3.

Figure 1:
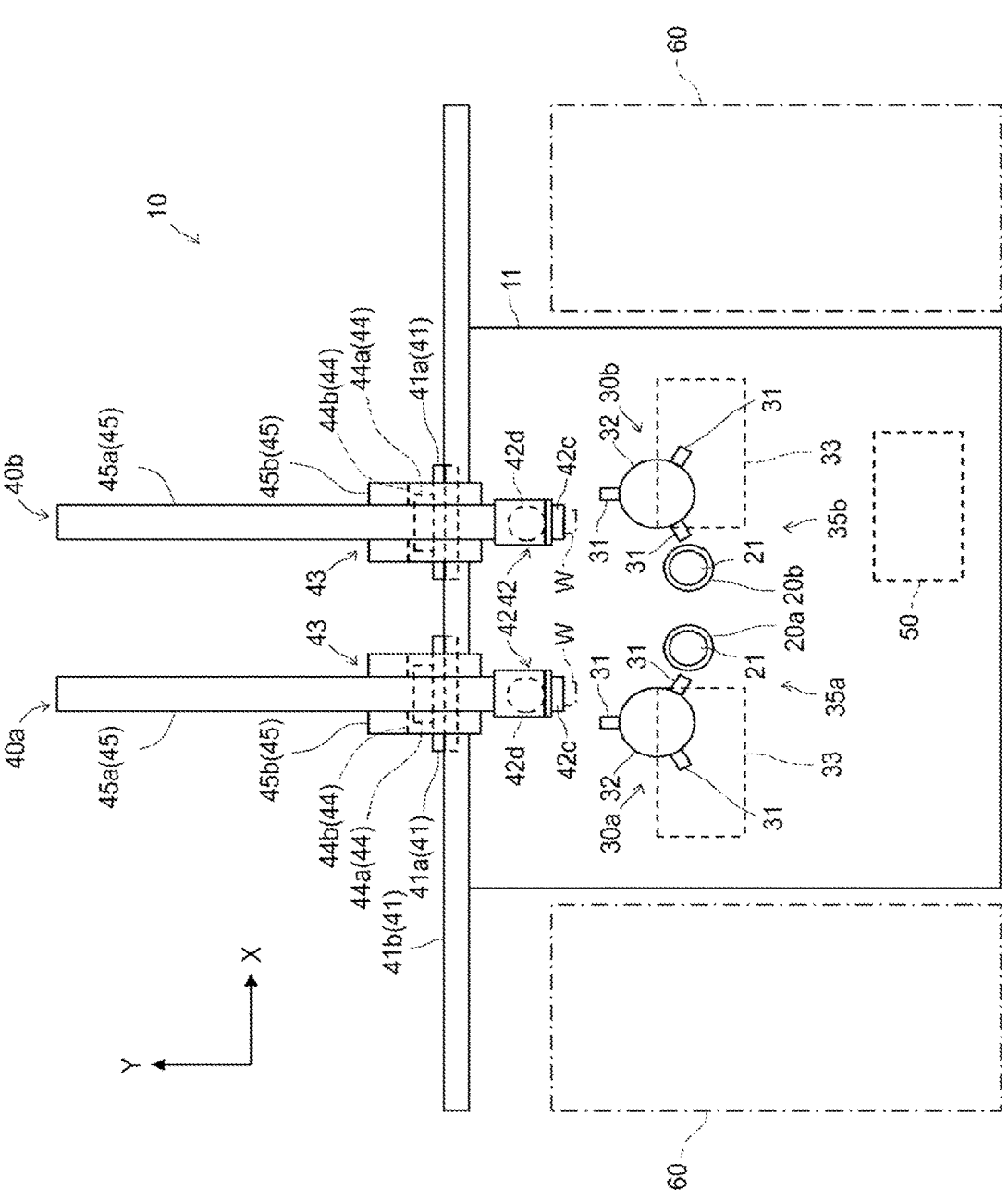
FIG. 1 is a front view illustrating machine tool 10 to which a workpiece processing apparatus is applied.

DESCRIPTION OF EMBODIMENTS (Machine Tool) Hereinafter, one embodiment will be described that is an example of a machine tool to which a workpiece processing apparatus is applied. In each of the following drawings, directions in the drawings will be described using an XYZ coordinate system. In the XYZ coordinate system, a plane parallel to a horizontal plane is defined as an XZ plane. In this XZ plane, axial directions of main spindles 20a and 20b of machine tool 10 described later are denoted as a Z-axis direction, and a direction orthogonal to the Z-axis direction is denoted as an X-axis direction. A direction perpendicular to the XZ plane is denoted as a Y-axis direction.

As illustrated in FIG. 1, machine tool 10 includes main body 11, pair of main spindles 20a and 20b, pair of tool tables 30a and 30b, pair of workpiece conveyance robots 40a and 40b (hereinafter, may be simply referred to as robots), and control device 50 for controlling main spindles 20a and 20b, tool tables 30a and 30b, and workpiece conveyance robots 40a and 40b.

Main spindle 20a rotatably holds workpiece W. Main spindle 20a is rotatably supported by a main spindle stand (not illustrated) provided on main body 11 so as to be horizontally disposed along a left-right direction (Z-axis direction) in FIG. 2. Main spindle chuck 21 for detachably gripping workpiece W is provided at a distal end portion of main spindle 20a. Main spindle 20a is rotationally driven by a servomotor (not illustrated). Main spindle chuck 21 has multiple gripping claws (not illustrated), and is capable of gripping workpiece W by closing the gripping claws and releasing workpiece W by opening the gripping claws. The opening or closing of main spindle chuck 21 is performed by an instruction from control device 50. Main spindle 20b is configured in the same manner as main spindle 20a.

Tool table 30a is a device for giving a feeding motion to the cutting tool 31. Tool table 30a is a so-called turret-type tool table, and has tool holding section 32 on which multiple cutting tools 31 for cutting workpiece W are mounted. Tool holding section 32 is rotatably supported by a rotary driving section (not illustrated) and can be positioned at a predetermined cutting position. In tool table 30a, tool table 30a and cutting tool 31 are moved by tool table moving device 33 along the left-right direction (the X-axis direction) and a front-rear direction (the Z-axis direction) in FIG. 1. Tool table moving device 33 has an X-axis driving device (not illustrated) for moving tool table 30a along the X-axis direction, and a Z-axis driving device (not illustrated) for moving tool table 30a along the Z-axis direction. The X-axis driving device and the Z-axis driving device are each driven by a servomotor. Tool table 30b is configured similarly to tool table 30a.

Main spindle 20a and tool table 30a described above constitute processing section 35a for processing workpiece W. Main spindle 20b and tool table 30b described above constitute processing section 35b for processing workpiece W.

(Robot)

Robots 40a and 40b can travel on the same traveling table, respectively, and can carry workpiece W into and out of main spindles 20a and 20b and workpiece placement device 60. Workpiece placement device 60 is a device on which workpiece W can be placed, and includes, for example, a workpiece carrying-in device for placing workpiece W carried into machine tool 10 on a placement surface, a workpiece carrying-out device for placing workpiece W carried out from machine tool 10 on the placement surface, and a reversing/shifting device for reversing or shifting the posture of workpiece W carried out from machine tool 10.

Robot 40a includes traveling section 41 for causing robot 40a itself to travel (move along the X-axis), gripping section 42 for detachably gripping workpiece W, and gripping section movement section 43 for moving gripping section 42 relative to traveling section 41. In the present embodiment, robot 40a is, for example, a three-axis orthogonal robot (three-axis gantry robot). Robot 40a is not limited to the orthogonal robot, and may be a vertical articulated robot, a horizontal articulated robot (scalar type robot), or a parallel link robot. Robot 40b is configured similarly to robot 40a.

(Traveling Section)

As illustrated in FIG. 1, traveling section 41 includes traveling section slider 41a (which may be referred to as an X-axis slider), guide section 41b which is a traveling table for guiding and causing traveling section slider 41a to travel, and traveling drive device 41c (see FIG. 3) for traveling and driving traveling section slider 41a.

Traveling section slider 41a can mount gripping section 42 and gripping section movement section 43, and is guided by guide section 41b extending along the left-right direction (the X-axis direction) in FIG. 1 to be reciprocated (linearly moved) along the left-right direction.

Guide section 41b is provided on main body 11, and is disposed above main spindles and 20b and tool tables 30a and 30b. One end portion (a left end portion in FIG. 1) of guide section 41b extends to a position immediately above workpiece placement device installed on a left side of main body 11. The other end portion (a right end portion in FIG. 1) of guide section 41b extends to a position immediately above workpiece placement device 60 installed on a right side of main body 11. A traveling drive shaft (X-axis drive shaft) is configured by traveling section slider 41a and guide section 41b.

Traveling drive device 41c is provided on a side of traveling section slider 41a or guide section 41b. Traveling drive device 41c includes servomotor 41c1 (see FIG. 3), a driving force transmitting mechanism (not illustrated), and the like. Traveling section slider 41a travels and moves with respect to guide section 41b by a rotational output of servomotor 41c1.

Figure 3:
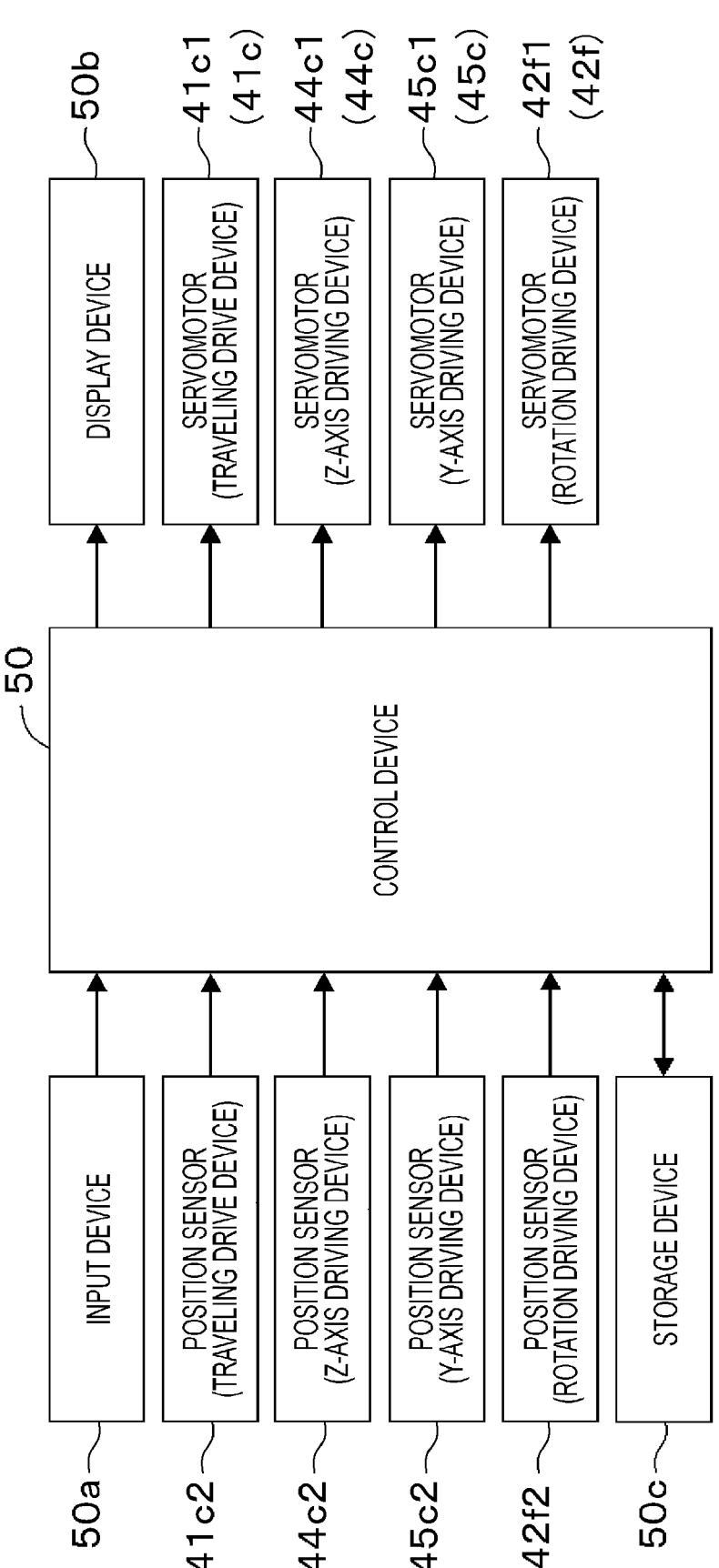
FIG. 3 is a block diagram illustrating machine tool 10.

As illustrated in FIG. 3, servomotor 41c1 is connected to control device 50. Servomotor 41c1 is rotationally driven in accordance with an instruction from control device 50. By driving servomotor 41c1, robots 40a and 40b can be moved in the + direction of the X-axis (right direction) and the − direction of the X-axis (left direction). In addition, servomotor 41c1 incorporates position sensor (for example, a resolver, an encoder) 41c2 (see FIG. 3) for detecting the position (for example, the rotation angle) of servomotor 41c1. The detection result of position sensor 41c2 is transmitted to control device 50.

(Gripping Section)

Figure 2:
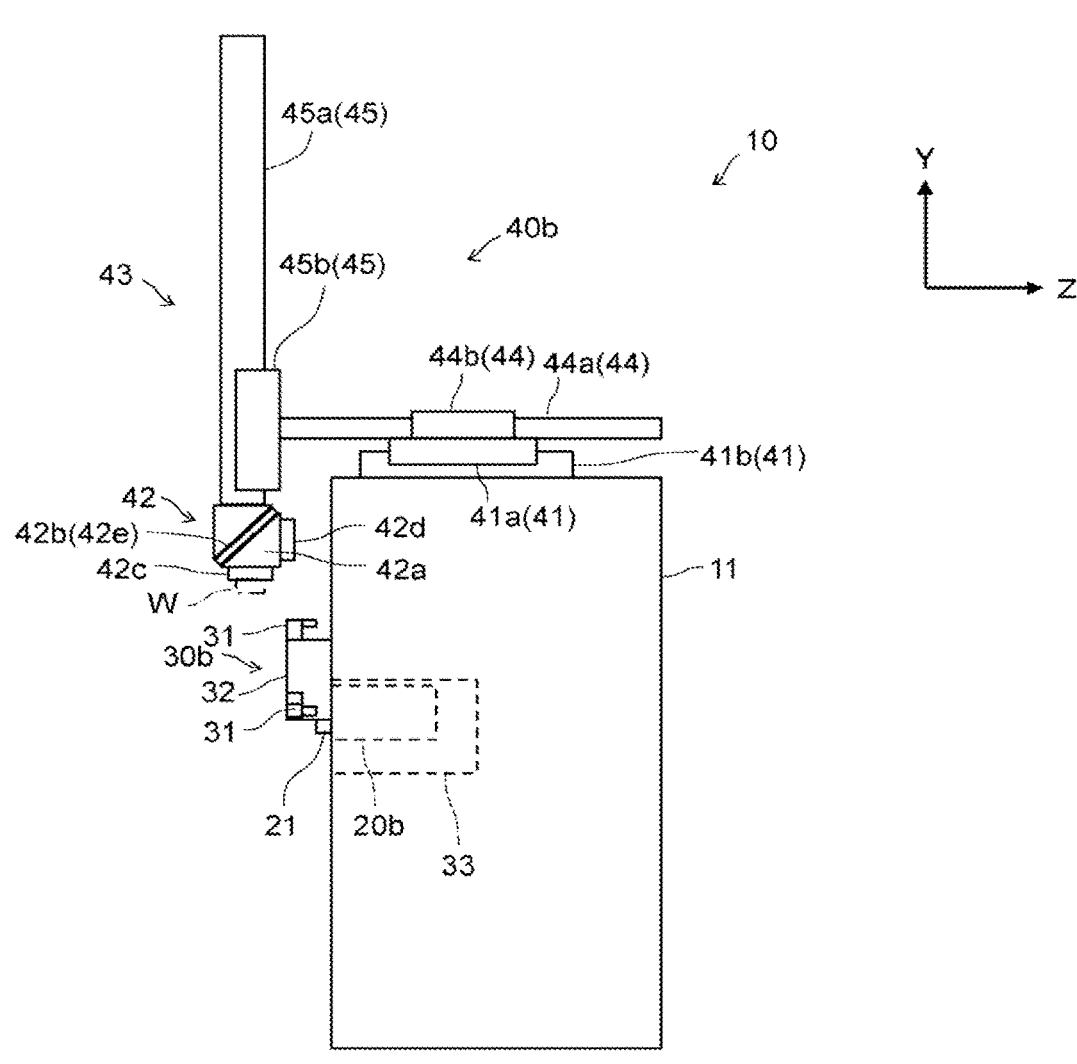
FIG. 2 is a right side view illustrating machine tool 10 illustrated in FIG. 1.

As mainly illustrated in FIG. 2, gripping section 42 is rotatably coupled to Y-axis slider 45a via rotary driving section 42b. Gripping section 42 has triangular prism-shaped main body 42a having two orthogonal side surfaces and a remaining side surface. A first one of the two orthogonal side surfaces is a plane that can be parallel to the X-Z plane, and robot chuck 42c that detachably grips workpiece W is provided on the one side surface. A second one of the two orthogonal side surfaces is a plane parallel to the X-Y plane, and robot chuck 42d for detachably gripping workpiece W is provided on the other side surface.

Main body 42a is rotatable about a gripping section rotation axis (described later) by rotary driving section 42b, so that each of robot chucks 42c and 42d can be rotationally switched to two positions (a downward position in the Y-axis direction and a rearward position in the Z-axis direction). As a result, by positioning each of robot chucks 42c and 42d downward in the Y-axis direction, gripping section 42 can deliver workpiece W to a placement surface (for example, placement surface of workpiece placement device 60) that is directed upward in the Y-axis direction. In addition, by positioning each of robot chucks 42*c* and 42*d* in the rearward position in the Z-axis direction, gripping section 42 can deliver workpiece W to a placement surface (for example, placement surface of main spindle chuck 21 of main spindles 20*a* and 20*b*) that is directed forward in the Z-axis direction. Robot chucks 42*c* and 42*d* have multiple gripping claws (not illustrated), and can grasp workpiece W by closing the gripping claws and release workpiece W by opening the gripping claws. The opening and closing of robot chucks 42*c* and 42*d* are performed by instructions from control device 50.

Rotary driving section 42*b* provided on an inclined surface of a distal end portion (lower end portion) of Y-axis slider 45*a* is attached (connected) to the remaining side surface of main body 42*a*. The remaining side surface of main body 42*a* is disposed parallel to an inclined surface of a distal end portion of Y-axis slider 45*a*. As illustrated in FIG. 2, rotary driving section 42*b* includes rotary drive shaft 42*e* provided in rotary driving section 42*b*, and rotation driving device 42*f* (see FIG. 3) that rotationally drives rotary drive shaft 42*e*. Rotary drive shaft 42*e* has a rotation axis (gripping section rotation axis) orthogonal to the remaining side surface of main body 42*a*, and is rotatable around the rotation axis.

Rotation driving device 42*f* is provided on Y-axis slider 45*a* or main body 42*a*. Rotation driving device 42*f* includes servomotor 42*f*1, driving force transmitting mechanism (not illustrated), and the like. Rotary drive shaft 42*e* is rotated with respect to a distal end portion of Y-axis slider 45*a* by the rotational output of servomotor 42*f*1, so that gripping section 42 is allowed to rotate with respect to Y-axis slider 45*a* around the gripping section rotation axis of rotary drive shaft 42*e*.

As illustrated in FIG. 3, servomotor 42*f*1 is connected to control device 50. Servomotor 42*f*1 incorporates position sensor 42*f*2 (see FIG. 3) for detecting the position of servomotor 42*f*1. The detection result of position sensor 42*f*2 is transmitted to control device 50.

(Gripping Section Movement Section)

Gripping section movement section 43 relatively moves gripping section 42 with respect to traveling section slider 41*a* in the left-right direction (Z-axis direction) and the up-down direction (Y-axis direction) in FIG. 2. Gripping section movement section 43 has Z-axis driving section 44 that moves gripping section 42 along the Z-axis direction, and Y-axis driving section 45 that moves gripping section 42 along the Y-axis direction.

(Z-Axis Driving Section)

Z-axis driving section 44 moves Z-axis slider 44*a* slidably attached to traveling section slider 41*a* along the Z-axis direction. As mainly illustrated in FIG. 2, Z-axis driving section 44 includes Z-axis slider 44*a*, Z-axis guide section 44*b* for guiding and moving Z-axis slider 44*a*, and Z-axis driving device 44*c* (see FIG. 3) for moving and driving Z-axis slider 44*a*.

Z-axis slider 44*a* is capable of mounting Y-axis driving section 45 and thus gripping section 42, and is extended along the left-right direction (Z-axis direction) in FIG. 2, and is guided by Z-axis guide section 44*b* to reciprocate (move linearly) along the Z-axis direction. Z-axis guide section 44*b* is provided on traveling section slider 41*a*. Z-axis driving device 44*c* (see FIG. 3) is provided on Z-axis guide section 44*b* or Z-axis slider 44*a*. Z-axis driving device 44*c* includes servomotor 44*c*1, a driving force transmitting mechanism (not illustrated), and the like. Z-axis slider 44*a* is moved with respect to Z-axis guide section 44*b* by the rotational output of servomotor 44*c*1.

As illustrated in FIG. 3, servomotor 44*c*1 is connected to control device 50. Servomotor 44*c*1 is rotationally driven in accordance with an instruction from control device 50. In addition, servomotor 44*c*1 incorporates position sensor (for example, resolver, encoder) 44*c*2 that detects the position (for example, rotation angle) of servomotor 44*c*1. A detection result of position sensor 44*c*2 is transmitted to control device 50.

(Y-Axis Driving Section)

Y-axis driving section 45 moves Y-axis slider 45*a* (on which gripping section 42 is supported) slidably attached to Z-axis slider 44*a* along the Y-axis direction. As mainly illustrated in FIG. 2, Y-axis driving section 45 includes Y-axis slider 45*a*, Y-axis guide section 45*b* for guiding and moving Y-axis slider 45*a*, and Y-axis driving device 45*c* (see FIG. 3) for moving and driving Y-axis slider 45*a*.

Y-axis slider 45*a* can mount gripping section 42, and is extended along the up-down direction (the Y-axis direction) in FIG. 2, and is guided by Y-axis guide section 45*b* to reciprocate (move linearly) along the Y-axis direction. Y-axis guide section 45*b* is provided on Z-axis slider 44*a*.

Y-axis driving device 45*c* (see FIG. 3) is provided on Y-axis guide section 45*b* or Y-axis slider 45*a*. Y-axis driving device 45*c* includes servomotor 45*c*1, a driving force transmitting mechanism (not illustrated), and the like. Y-axis slider 45*a* moves with respect to Y-axis guide section 45*b* by the rotational output of servomotor 45*c*1.

As illustrated in FIG. 3, servomotor 45*c*1 is connected to control device 50. Servomotor is rotationally driven in accordance with an instruction from control device 50. In addition, servomotor 45*c*1 incorporates a position sensor (for example, resolver, encoder) that detects the position (for example, rotation angle) of servomotor 45*c*1. A detection result of position sensor 45*c*2 is transmitted to control device 50.

(Control Device)

Control device 50 is a control device for driving and controlling main spindles 20*a* and tool tables 30*a* and 30*b*, and robots 40*a* and 40*b*. In particular, control device 50 performs the movement control of robots 40*a* and 40*b*. As illustrated in FIG. 3, control device 50 is connected to input device 50*a*, display device 50*b*, storage device 50*c*, position sensors 41*c*2, 44*c*2, 45*c*2, and 42*f*2, and servomotors 41*c*1, 44*c*1, 45*c*1, and 42*f*1. Input device 50*a* is provided on a front surface of machine tool 10 for an operator to input various settings, various instructions, and the like to control device 50. Display device 50*b* is provided on a front surface of machine tool 10 for displaying information such as a driving situation and a maintenance situation to the operator. Storage device stores data related to the control of machine tool 10, for example, a control program (processing program), parameters used in the control program, data related to various settings and various instructions, load data (processing data), control information from the first and second robot control systems, and the like. Control device 50 includes a microcomputer (not illustrated), and the microcomputer includes an input/output interface, a CPU, a RAM, and a ROM (all not illustrated) that are connected to each other via a bus. The CPU executes various programs to acquire data, detection signals, control information, and the like from input device 50*a*, storage device 50*c*, and position sensors 41*c*2, 44*c*2, 45*c*2, and 42*f*2, and to control display device 50*b* and servomotors 41*c*1, 44*c*1, 45*c*1, and 42*f*1. The RAM is designed to temporarily store variables necessary for executing the same programs, and the ROM is designed to store the programs.

(Traveling Control of Robot)

In addition, the traveling control of robot 40*a* by the above-described machine tool 10 (workpiece processing apparatus) will be described with reference to the flowchart illustrated in FIG. 4. Control device 50 performs processing according to the present flowchart. Control device 50 has a first robot control system, which is a control system for controlling first robot 40*a*, and a second robot control system, which is a control system for controlling second robot 40*b*, so that each of robots 40*a* and 40*b* can be independently controlled. That is, both the first robot control system and the second robot control system execute the processing according to the present flowchart. In the present embodiment, the traveling control (including interlock confirmation processing) of first robot 40*a* performed in the first robot control system will be described.

In the second robot control system, similarly to the traveling control of first robot 40*a*, the traveling control of second robot 40*b* (including interlock confirmation processing) along the present flowchart is executed. In the first robot control system, first robot 40*a* is an own robot, second robot 40*b* is a partner robot, and in the second robot control system, second robot 40*b* is an own robot, and first robot 40*a* is a partner robot. In addition, an origin of the robot located on an entrance side (left side in FIG. 1) is set to a left end of guide section 41*b*, and an origin of the robot located on an exit side (right side in FIG. 1) is set to a right end of guide section 41*b*.

In Step S102, control device 50 determines whether an instruction to start the interlock confirmation processing is issued in a processing program (particularly, a robot program for controlling robots 40*a* and 40*b*). When there is a description of interlock confirmation processing M code (for example, "M300"), which is an M code indicating the interlock confirmation processing, in the processing program, control device 50 determines that there is an instruction (command) to start the interlock confirmation processing (YES in Step S102), and advances the program to Step S104. When there is no interlock confirmation processing M code (for example, "M300"), which is the M code indicating the interlock confirmation processing, in the processing program, control device 50 determines that there is no instruction to start the interlock confirmation processing (NO in Step S102), and ends the program tentatively.

The interlock confirmation processing is processing for confirming that, when the movement control (X-axis movement control) along the X-axis of first robot 40*a* or second robot 40*b* is performed, first robot 40*a* and second robot 40*b* do not contact each other in a case where the movement control is performed. That is, the interlock confirmation processing is also processing for confirming whether the X-axis movement control of own robot 40*a* is possible. The interlock confirmation processing M code is described immediately before a program line related to the X-axis movement control of robot 40*a*. An example of the processing program will be described below (processing program example 1).

Processing Program Example 1

.

.

.

M300

GOX #502

GOY #702

GOZ[#602-#100]

.

.

.

In Step S104, control device 50 holds the interlock confirmation processing started in Step S102. That is, control device 50 holds the program executed in the processing program in the interlock confirmation processing M code. As a result, control device 50 can perform the interlock confirmation processing before X-axis movement processing to be performed next in the processing program starts.

According to the processing in Steps S106 to S120, before the own robot executes the X-axis movement control, control device 50 uses a current position and a next command value of the own robot, as well as a current position and a movement destination position of the partner robot, to determine movability of the own robot in the X-axis direction (interlock confirmation processing). The own robot is first robot 40*a* in the first robot control system, and is second robot 40*b* in the second robot control system. The partner robot is second robot 40*b* in the first robot control system, and is first robot 40*a* in the second robot control system.

In Step S106, control device 50 determines whether the current position (own robot current position) of own robot 40*a* at a start time (determination start time) of the interlock confirmation processing is located on the entrance side or the exit side with respect to an own robot next command value which is an instruction value related to the movement control instruction issued to own robot 40*a* immediately after the determination start time and indicates the movement destination position of own robot 40*a*. The determination start time is a time at which it is started to determine whether own robot 40*a* can start traveling (movement along the X-axis). The movement control instruction is a next command that is a control instruction (control command) issued next to the command to start the interlock confirmation processing. For example, in FIGS. 5 to 16, the entrance side is a side into which workpiece W is carried in machine tool 10, and in the present embodiment, is the left side. The exit side is a side from which workpiece W is carried in machine tool 10, and in the present embodiment, is the right side.

Figure 5:
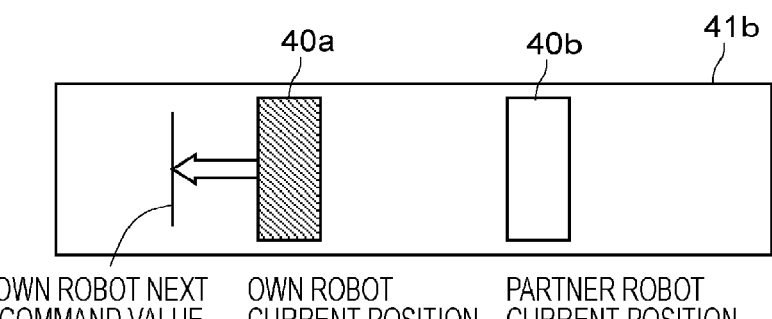
FIG. 5 is a schematic diagram illustrating case 1 related to operations of first robot (own robot) 40*a* and a second robot (partner robot).

For example, FIG. 5 illustrates a case where the own robot current position is located on the exit side (on the right side) with respect to the own robot next command value. In FIG. 5, assuming that the origin of the X-axis is set to the left end (entrance side end) of guide section 41*b* and the X-axis coordinate value increases in the rightward direction, the own robot current position>the own robot next command value (own robot current position−own robot next command value>0). Conversely, when the own robot current position is located on the entrance side (on the left side) with respect to the own robot next command value, the own robot current position<the own robot next command value (own robot current position−own robot next command value<0).

In other words, it is possible to determine whether the own robot current position is located on the exit side or the entrance side with respect to the own robot next command value based on whether a difference (second difference) between the own robot current position and the own robot next command value, which is the own robot current position−the own robot next command value, is larger than 0 which is a second predetermined value. The second predetermined value may be set to a value other than 0 (zero), and in this case, the second predetermined value may be set in consideration of a distance that can be approached between own robot 40*a* and partner robot 40*b*. In addition, the term "located on the exit side" means that the own robot is moved toward the entrance side, and also means that the own robot is moved in a direction away from the partner robot. The term "located on the entrance side" means that the own robot is moved toward the exit side, and also means that the own robot is moved in a direction approaching the partner robot.

When the second difference (the own robot current position–the own robot next command value) is larger than the second predetermined value, control device 50 determines that own robot 40a is moved toward the entrance side (YES in Step S106), and advances the program to Step S116. In Step S116, control device 50 cancels the interlock confirmation processing held in Step S104. As a result, the interlock confirmation processing ends, so that control device 50 can execute a movement control instruction (next movement control instruction) of own robot 40a to be executed next. After the processing of Step S116 ends, control device 50 ends the present flowchart.

When the second difference (the own robot current position–the own robot next command value) is smaller than the second predetermined value, control device 50 determines that own robot 40a is moved toward the exit side (NO in Step S106), and advances the program to Step S108.
(Determination as to Whether to Prioritize Interlock Confirmation Processing of Own Robot)

In Step S108, control device 50 determines whether determination (interlock confirmation processing) as to movability of own robot 40a may be preferentially performed over partner robot 40b (movability determination priority determination). In a case where the determination as to movability of partner robot 40b is prioritized, control device 50 can stand by without performing the determination as to the movability of own robot 40a. Specifically, in Step S108, control device 50 performs the movability determination priority determination depending on whether own robot 40a is located on the entrance side with respect to partner robot 40b. When own robot 40a is located on the entrance side with respect to partner robot 40b, control device 50 determines that the determination as to the movability of the own robot is preferentially performed (own robot movability priority determination) (YES in Step S108), and when own robot 40a is located on the exit side with respect to partner robot 40b, control device 50 determines that the determination as to the movability of the partner robot is preferentially performed (partner robot movability priority determination) (NO in Step S108).

As described above, control device 50 determines whether to continue or stop the determination as to the movability of own robot 40a depending on whether the determination as to the movability of own robot 40a is prioritized over the determination as to the movability of partner robot 40b (the second determination section). Control device 50 may include the second determination section that determines whether to continue or stop the determination (determination by the first determination section) as to the movability of own robot 40a, depending on the movement control of own robot 40a (the first robot) is prioritized over the movement control of partner robot 40b (the second robot).

When own robot 40a is located on the entrance side with respect to partner robot 40b, control device 50 determines "YES" in Step S108, advances the program to Step S110 and subsequent steps, and continues the determination as to the movability of own robot 40a. Meanwhile, when own robot 40a is not located on the entrance side but on the exit side with respect to partner robot 40b, control device 50 determines "NO" in Step S108, advances the program to Step S118 and subsequent steps, and further confirms a movability determination situation of partner robot 40b.

In Step S118, control device 50 acquires control information from the second robot control system, and determines whether partner robot 40b is in a waiting start scan state. The waiting start scan state is a scan state in which partner robot 40b starts the interlock confirmation processing, that is, a state in which partner robot 40b detects (searches) the start of the interlock confirmation processing. The control information includes a determination result of the start of the interlock confirmation processing in each of robots and 40b. The start determination result of the interlock confirmation processing is transmitted from a first one of robots 40a and 40b to a second one of robots 40a and 40b. Each of robots 40a and 40b can determine whether partner robot 40b is in the waiting start scan state based on the acquired determination result of the start of the interlock confirmation processing of the partner. That is, each of robots 40a and 40b determines that the partner robot is in the waiting start scan state when the determination result of the start of the interlock confirmation processing of the partner has not been acquired, whereas when the determination result of the start of the interlock confirmation processing of the partner has been acquired, determines that the partner robot is not in the waiting start scan state (the waiting start scan state has ended).

When partner robot 40b is in the waiting start scan state, control device 50 determines "YES" in Step S118, and repetitively executes the processing in Step S118 until partner robot 40b is no longer in the waiting start scan state (until the waiting start scan state ends). When partner robot 40b is not in the waiting start scan state (when the waiting start scan state ends), control device 50 determines "NO" in Step S118, and advances the program to Step S120.

In Step S120, control device 50 acquires control information from the second robot control system, and determines whether the entrance-side robot (partner robot 40b) is waiting (described later). The "waiting" is a state in which both robots 40a and 40b may come into contact with each other when own robot 40a and/or partner robot 40b execute a next movement control instruction. In other words, the term "waiting" means that a target robot (here, partner robot 40b on the entrance side) is performing the interlock confirmation processing, and is waiting for the execution of the movement control after the interlock confirmation processing. As the control information, there are determination results (movability determination result such as movement OK, movement NG (waiting)) in the interlock confirmation processing of the entrance-side robot (partner robot 40b) in each of robots 40a and 40b.

When the determination result in the interlock confirmation processing of the entrance-side robot (partner robot 40b) is "movement OK", control device 50 determines that the entrance-side robot (partner robot 40b) is not waiting (NO in Step S120), advances the program to Step S110, and restarts the interlock confirmation processing of own robot 40a. For example, as illustrated in FIG. 6, in a case where partner robot 40b and own robot 40a do not come into contact (do not interfere) with each other even when the movement control is performed by the next movement control instruction in partner robot 40b and own robot 40a, partner robot 40b is subjected to the movement control according to the next movement control instruction, while own robot 40a restarts the interlock confirmation processing, cancels the holding of the interlock confirmation processing, and is then subjected to the movement control according to the next movement control instruction.

Figure 6:
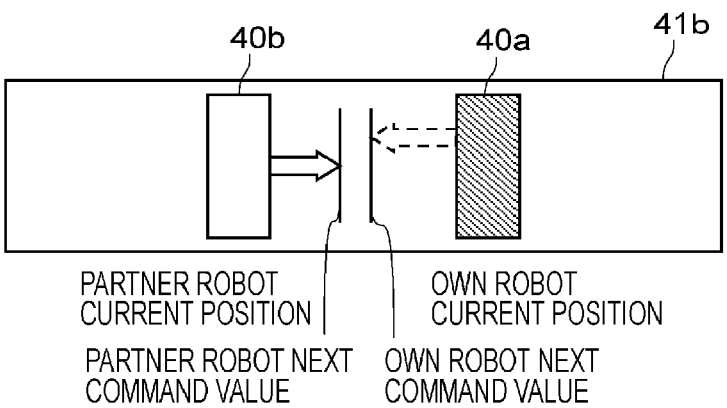
FIG. 6 is a schematic diagram illustrating an operation related to a second robot control system among the operations of first robot (own robot) 40*a* and the second robot (partner robot).

FIG. 6 illustrates a case where partner robot 40b and own robot 40a do not come into contact (do not interfere) with each other even when the movement control is performed by the next movement control instruction. For example, the case of FIG. 6 is a case where own robot 40a is located on the exit side and partner robot 40b is located on the entrance side, a case where partner robot 40b moves (or stops) in the + direction of the X-axis and own robot 40a moves in the – direction of the X-axis, and a case where the next command value (next movement destination, movement destination position) of partner robot 40b is located in the – direction of the X-axis with respect to the next command value (next movement destination) of own robot 40a.

Meanwhile, when the determination result in the interlock confirmation processing of the entrance-side robot (partner robot 40b) is "movement NG", control device 50 determines that the entrance-side robot (partner robot 40b) is "waiting" (YES in Step S120), advances the program to Step S122, and performs retraction operation processing for retracting own robot 40a.

Figure 7:
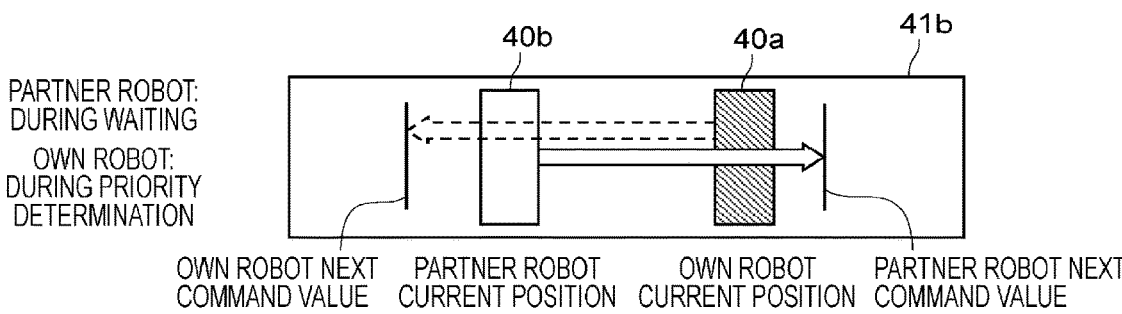
FIG. 7 is a schematic diagram illustrating a case where the second robot (partner robot) is waiting and first robot (own robot) 40*a* is performing priority determination.
Figure 8:
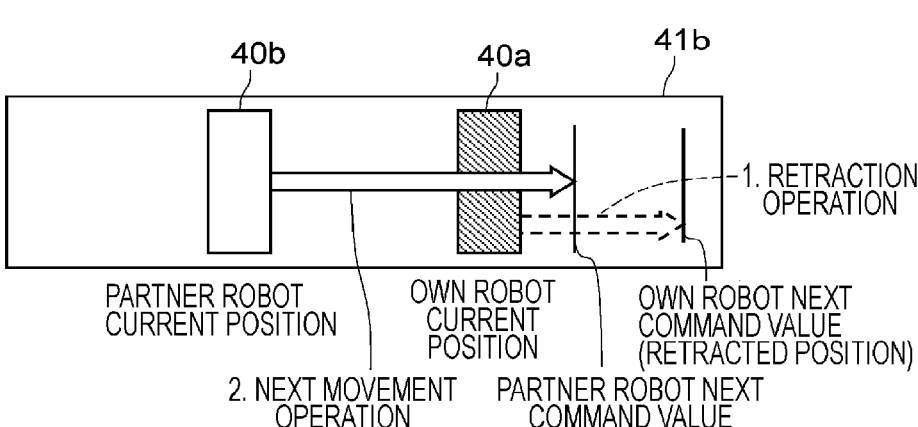
FIG. 8 is a schematic diagram illustrating an operation of moving the second robot (partner robot) after first robot (own robot) 40*a* is retracted.

For example, as illustrated in FIG. 7, in a case where partner robot 40b moves from the current position in the + direction of the X-axis (the right direction in FIG. 7) to move beyond the current position of own robot 40a to the next command value (the next movement destination), and own robot 40a moves from the current position in the – direction of the X-axis (the left direction in FIG. 7) to move beyond the current position of partner robot 40b to the next command value (the next movement destination), when the movement control is performed as it is, partner robot 40b and own robot 40a come into contact (interfere) with each other.

In this case, in the second robot control system of partner robot 40b, it is determined that "waiting (waiting continuation)" is performed by the interlock confirmation processing as described later. Further, in the first robot control system of own robot 40a, as described above, the determination that the entrance-side robot (partner robot 40b) is waiting is confirmed (certified) in Step S120. Thereafter, the interlock confirmation processing is interrupted (without performing the processing in Steps S110 to 116), so that own robot 40a can be moved (retracted) from the current position to a position (retracted position: see FIG. 8) where the contact (interference) does not occur (Step S122). In this manner, by retracting own robot 40a, it is possible to preferentially control partner robot 40b located on the entrance side. The retracted position is a next movement destination position of own robot 40a that does not come into contact (interfere) with own robot 40a even when partner robot 40b moves by the next movement control instruction.

In Step S122, control device 50 performs retraction operation processing of own robot 40a. For example, control device 50 performs research of block (block research) to execute a retraction operation block. The blocks are one unit constituting the processing program and are divided according to the operation content of the robot. Robots 40a and successively execute multiple blocks. Examples of the blocks include an entrance block, an M/C block, a cycle stop block, and a retraction operation block. The entrance block is a block in which robots 40a and 40b move to workpiece placement device 60 on the entrance side to take workpiece W which is the processing target. The M/C block is a block in which robots 40a and 40b move (approach) to processing sections 35a and 35b to replace processing completed workpiece W and unprocessed workpiece W. The cycle stop block is a block for returning robots 40a and 40b to the origin and ending self-driving of robots 40a and 40b. The retraction operation block is a block for moving a robot (own robot 40a) that is not on the priority control side (non-priority control) to a retracted position that does not come into contact with partner robot 40b when there is a possibility that robots 40a and 40b come into contact (interfere) with each other.

The block research is to forcibly perform a block search in the middle of the block instead of at the end of the block. The block research interrupts a block currently executed immediately after the search is completed, and executes the searched block. For example, when an abnormality occurs in the M/C during the M/C block, the cycle stop block is searched when the block research is executed. As a result, the M/C block is interrupted, and the cycle stop block is started.

The block search is a process of determining (searching) a block to be executed next when the block is completed. After the search is completed, the searched block is executed. For example, in a case where the block search is performed after the end of the input block, or in a case where robots 40a and 40b have unprocessed workpieces W, the M/C block is searched. Then, the M/C block is started.

In Step S122, control device 50 calculates (operates) the retracted position from the next command value of partner robot 40b acquired in advance in the retraction operation block, and then controls traveling drive device 41c (servomotor 41c1) to move own robot 40a to the retracted position. After the processing of Step S122, control device 50 tentatively ends the program.

The explanation will be returned to the interlock confirmation processing. In Step S110, control device 50 can determine movability of the own robot by the movement control instruction from a first difference between the own robot next command value and the partner robot movement destination position (first determination section). Similar to the processing in Step S106, the own robot next command value is an instruction value related to the movement control instruction issued to own robot 40a immediately after the determination start time, and indicates the movement destination position of own robot 40a. The partner robot movement destination position is a value related to the movement control instruction executed by partner robot 40b at the time when the interlock confirmation processing starts, and is the movement destination position of partner robot 40b indicating the movement destination position of partner robot 40b. The partner robot movement destination position is the movement destination of partner robot 40b currently moving, and the movement destination is acquired from the second robot control system. The partner robot movement destination position may employ the partner robot next command value (partner robot next movement destination). The first difference is the partner robot movement destination position–the own robot next command value and is a difference between the partner robot movement destination position and the own robot next command value.

Figure 9:
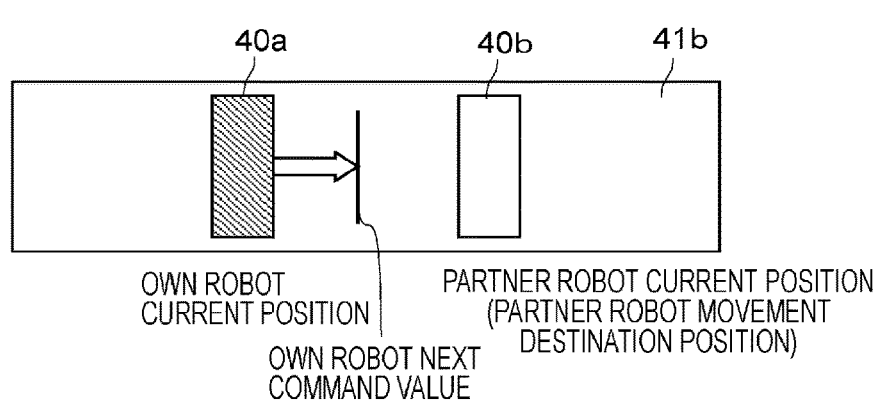
FIG. 9 is a schematic diagram illustrating case 2-1 related to the operations of first robot (own robot) 40*a* and the second robot (partner robot).

For example, FIG. 9 illustrates a case where the partner robot movement destination position is located on the right side (on the exit side) of the own robot next command value. In FIG. 9, similarly to FIG. 5, the partner robot movement destination position>the own robot next command value (partner robot movement destination position–the own robot next command value>0). At this time, when the partner robot movement destination position is located on the right side (on the exit side) of the own robot next command value, there is no possibility that own robot 40a will overtake (catch up with) partner robot 40b, and own robot 40a does not come into contact with partner robot 40b. Conversely, when the partner robot movement destination position is located on the left side (on the entrance side) of the own robot next command value, the partner robot movement destination position<the own robot next command value (partner robot movement destination position−the own robot next command value<0). At this time, when the partner robot movement destination position is located on the left side (on the entrance side) of the own robot next command value, there is a possibility that own robot 40a will overtake (catch up with) partner robot 40b, and thus, own robot 40a comes into contact with partner robot 40b.

In other words, it is possible to determine whether the partner robot movement destination position is located on the exit side or the entrance side with respect to the own robot next command value (whether own robot 40a comes into contact with partner robot 40b) based on whether the difference (first difference) between the partner robot movement destination position and the own robot next command value, which is the partner robot movement destination position−own robot next command value, is larger than a first predetermined value. Preferably, the first predetermined value is a value larger than 0 (zero) and is set to a value smaller than a distance (accessible distance) that can be stopped with a margin so that both robots 40a and 40b that are approaching each other do not come into contact with each other even when they are close to each other. In the present embodiment, the first predetermined value is set to the accessible distance.

When the first difference (the partner robot movement destination position−the own robot next command value) is larger than the first predetermined value (the accessible distance), control device 50 determines that own robot 40a is unlikely to overtake partner robot 40b, and determines that own robot 40a is unlikely to come into contact with partner robot 40b (YES in Step S110), and advances the program to Step S112.

Meanwhile, when the first difference (the partner robot movement destination position−the own robot next command value) is smaller than the first predetermined value (the accessible distance), control device 50 determines that own robot 40a may overtake partner robot 40b and determines that own robot 40a may come into contact with partner robot 40b (NO in Step S110), and repetitively executes the determination processing in Step S110 until the first difference is larger than the accessible distance. At this time, in the robot control system on the partner side as well, in a case where the control is performed in the same manner as the robot control system on the own side, and the movement control of the robot on the partner side is preferentially performed, since the robot on the partner side is moved, the first difference may be larger than the accessible distance.

In Step S112, control device 50 can determine the movability of the own robot by the movement control instruction based on a third difference between the own robot next command value and a partner robot current position (the first determination section). Similar to the processing in Step S106, the own robot next command value is an instruction value related to the movement control instruction issued to own robot 40a immediately after the determination start time, and indicates the movement destination position of own robot 40a. The partner robot current position is the current position of partner robot 40b at the time when the interlock confirmation processing starts. At this time, actual coordinates indicating the actual position detected by the position sensor described above are used as the current position. The actual coordinates include a delay amount generated with respect to a servo command. Instead of the actual coordinates, a position indicating a command value corresponding to the servo command may be used. The partner robot current position is acquired from the second robot control system. The third difference is the difference between the partner robot current position and the own robot next command value, which is the partner robot current position−the own robot next command value.

For example, FIGS. 9 to 12 illustrates a case where the partner robot current position is located on the right side (on the exit side) of the own robot next command value. In FIGS. 9 to 12, similarly to FIG. 5, the partner robot current position>the own robot next command value (the partner robot current position−the own robot next command value>0). At this time, when the partner robot current position is located on the right side (on the exit side) of the own robot next command value, there is no possibility that own robot 40a will overtake (catch up with) partner robot 40b, and own robot 40a does not come into contact with partner robot 40b. Conversely, as illustrated in FIGS. 13 to 16, when the partner robot current position is located on the left side (on the entrance side) of the own robot next command value, the partner robot current position<the own robot next command value (partner robot current position−the own robot next command value<0). When the partner robot current position is located on the left side (on the entrance side) of the own robot next command value, there is a possibility that own robot 40a will overtake (catch up with) partner robot 40b, so that own robot 40a comes into contact with partner robot 40b.

In other words, it is possible to determine whether the partner robot current position is located on the exit side or the entrance side with respect to the own robot next command value (whether own robot 40a comes into contact with partner robot 40b) based on whether the difference (third difference) between the partner robot current position and the own robot next command value, which is the partner robot current position−own robot next command value, is larger than a third predetermined value. Preferably, similarly to the first predetermined value, the third predetermined value is a value larger than 0 (zero) and is set to a value smaller than a distance (accessible distance) that can be stopped with a margin so that both robots 40a and 40b that are approaching each other do not come into contact with each other even when they are close to each other. In the present embodiment, the third predetermined value is set to the accessible distance.

When the third difference (the partner robot current position−the own robot next command value) is larger than the third predetermined value (the accessible distance), control device 50 determines that own robot 40a is unlikely to overtake partner robot 40b, and determines that own robot 40a is unlikely to come into contact with partner robot 40b (YES in Step S112), and advances the program to Step S116. In Step S116, control device 50 cancels the interlock confirmation processing held in Step S104. As a result, the interlock confirmation processing ends, so that control device 50 can execute a movement control instruction (next movement control instruction) of own robot 40a to be executed next. After the processing of Step S116 ends, control device 50 ends the present flowchart.

Meanwhile, when the third difference (the partner robot current position−the own robot next command value) is smaller than the third predetermined value (the accessible distance), control device 50 determines that own robot 40a may overtake partner robot 40b, and that own robot 40a may come into contact with partner robot 40*b* (NO in Step S112), and advances the program to Step S114.

In Step S114, control device 50 can determine the movability of the own robot by the movement control instruction from a fourth difference between the partner robot current position and the own robot current position at the time when the interlock confirmation processing starts (the first determination section). The partner robot current position is the current position of partner robot 40*b* at the time when the interlock confirmation processing starts. The own robot current position is the current position of own robot 40*a* at the time when the interlock confirmation processing starts. The partner robot current position is acquired from the second robot control system. At this time, preferably, the actual coordinates (described above) indicating the actual position detected by the above-described position sensor are used as the partner robot current position. Preferably, the movement destination position that is a command value corresponding to the servo command is used as the own robot current position. The fourth difference is a difference (the partner robot current position/the own robot current position difference) between the partner robot current position and the own robot current position, which is the partner robot current position–the own robot current position.

Figure 16:
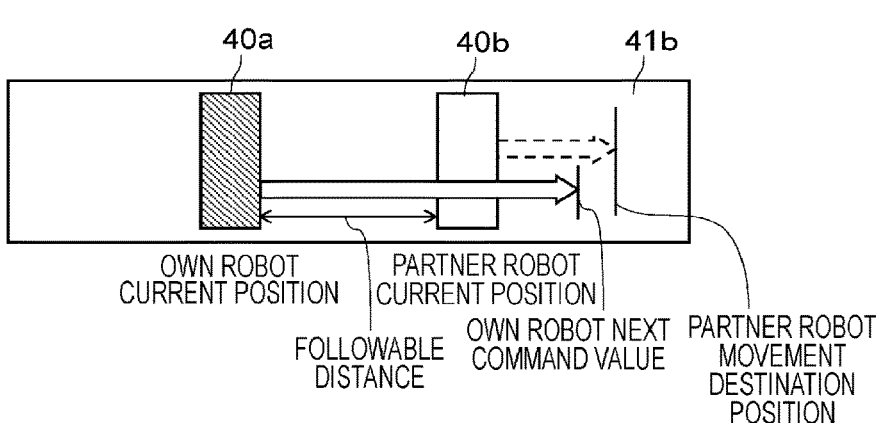
FIG. 16 is a schematic diagram illustrating case 3-4 related to the operations of first robot (own robot) 40*a* and the second robot (partner robot).

For example, FIG. 16 illustrates a case where the partner robot current position is located on the right side (on the exit side) of the own robot current position. In FIG. 16, similarly to FIG. 5, the partner robot current position>the own robot current position (the partner robot current position–the own robot current position>0). In addition, it is possible to determine whether own robot 40*a* can follow partner robot 40*b* based on whether the difference (the partner robot current position/own robot current position difference: fourth difference) between the partner robot current position and the own robot current position, which is the partner robot current position–the own robot current position, is larger than a fourth predetermined value. In other words, it is possible to determine whether partner robot 40*b* is overtaken by own robot 40*a* until reaching the partner robot movement destination position.

Preferably, the fourth predetermined value is set to a value larger than a distance (a followable distance: or a distance by which own robot 40*a* can overtake (catch up with) partner robot 40*b* before partner robot 40*b* reaches the partner robot movement destination position) by which own robot 40*a* can follow partner robot 40*b*. The followable distance can be calculated from the speed and the current position of own robot 40*a*, and the speed and the current position of partner robot 40*b*. In the present embodiment, the fourth predetermined value is set to the followable distance.

When the fourth difference (the partner robot current position–the own robot current position) is larger than the fourth predetermined value (the followable distance), control device 50 determines that own robot 40*a* can follow partner robot 40*b* (own robot 40*a* does not come into contact with partner robot 40*b*) (YES in Step S114), and advances the program to Step S116. In Step S116, control device 50 cancels the interlock confirmation processing held in Step S104. As a result, the interlock confirmation processing ends, so that control device 50 can execute a movement control instruction (next movement control instruction) of own robot 40*a* to be executed next. After the processing of Step S116 ends, control device 50 ends the present flowchart.

Meanwhile, when the fourth difference (the partner robot current position–the own robot current position) is smaller than the fourth predetermined value (the followable distance), control device 50 determines that own robot 40*a* cannot follow partner robot 40*b* (own robot 40*a* catches up and comes into contact with partner robot 40*b*) (NO in Step S114), and repetitively executes the determination processing in Steps S110 to S114 until the fourth difference is larger than the followable distance. At this time, also in the robot control system on the partner side, in a case where the control is performed in the same manner as the robot control system on the own side, and the movement control of the robot on the partner side is preferentially performed, since the robot on the partner side is moved, the fourth difference may be larger than the followable distance.

(Case 1: When Own Robot Moves in – Direction from Current Position and Partner Robot Stops or Moves in + Direction from Current Position)

In addition, the operation will be broken down into cases, and each case will be described. As illustrated in FIG. 5, the case 1 is a case where own robot 40*a* is located on the entrance side and partner robot 40*b* is located on the exit side, and a case where partner robot 40*b* stops (or moves in the + direction of the X-axis) and own robot 40*a* moves in the – direction of the X-axis. That is, the case 1 is a case where own robot 40*a* located on the entrance side moves away from partner robot 40*b*. The entrance side is a side into which workpiece W is carried in machine tool 10, and in the present embodiment, is the left side. The exit side is a side from which workpiece W is carried in machine tool 10, and in the present embodiment, is the right side. In FIG. 5, the directions of the arrows indicate the movement directions of robots 40*a* and 40*b*, and the lengths thereof indicate the movement amounts (movement destinations).

In the case 1, as illustrated in FIG. 5, the own robot current position at the start time (determination start time) of the interlock confirmation processing is on the exit side with respect to the own robot next command value indicating the movement destination position of own robot 40*a* that is the instruction value related to the movement control instruction (next command, which is the control instruction (control command) to be issued next to the command to start the interlock confirmation processing) issued to own robot 40*a* immediately after the determination start time. Therefore, the own robot current position>the own robot next command value, and the second difference, which is the own robot current position–the own robot next command value, is larger than 0 (zero) which is the second predetermined value.

In this case, since own robot 40*a* moves in accordance with the movement control instruction and moves away from partner robot 40*b*, even when own robot 40*a* moves by the movement control instruction, there is no possibility that own robot 40*a* and partner robot 40*b* collide (come into contact) with each other, and thus, in Step S106, control device 50 determines "YES", and can determine (movement OK determination) that own robot 40*a* can be moved by the movement control instruction.

(Cases 2-1 to 2-3: When Own Robot Moves in + Direction of X-Axis (Toward Partner Robot) from Current Position but Moves within Range that does not Come into Contact with Partner Robot)

Figure 10:
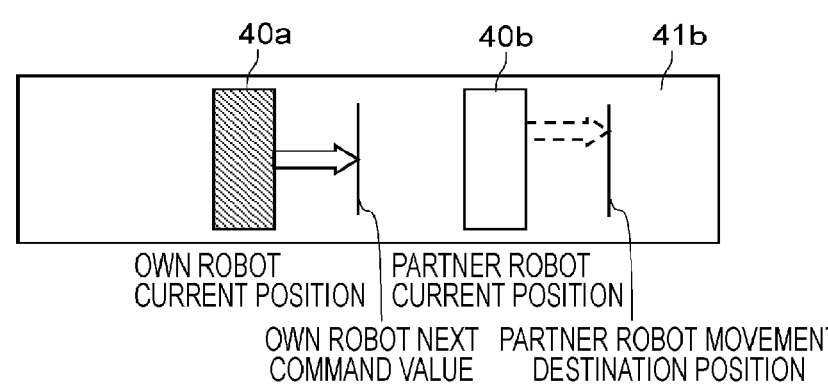
FIG. 10 is a schematic diagram illustrating case 2-2 related to the operations of first robot (own robot) 40*a* and the second robot (partner robot).
Figure 11:
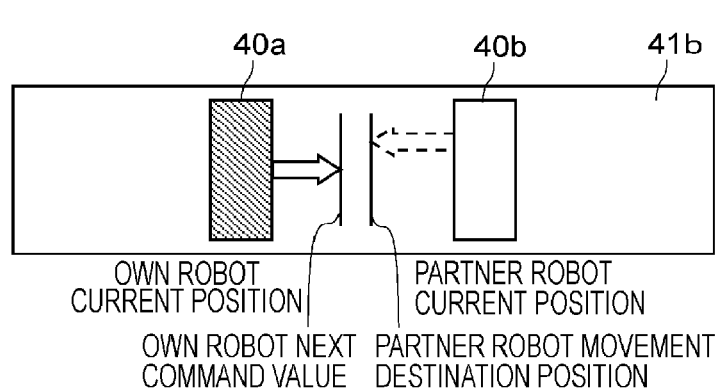
FIG. 11 is a schematic diagram illustrating case 2-3 related to the operations of first robot (own robot) 40*a* and the second robot (partner robot).

As illustrated in FIG. 9, the case 2-1 is a case where own robot 40*a* is located on the entrance side and partner robot 40*b* is located on the exit side, and a case where partner robot 40*b* stops, and own robot 40*a* moves in the + direction (toward the partner robot) from the current position, but moves within a range that does not reach partner robot 40*b* that is stopped. As illustrated in FIGS. 10 and 11, the cases 2-2 and 2-3 are cases where own robot 40*a* is located on the entrance side and partner robot 40*b* is located on the exit side, and cases where partner robot 40*b* moves in the + direction or the − direction of the X-axis, own robot 40*a* moves in the + direction (toward the partner robot) from the current position, but the own robot next command value is located on the left side (the entrance side) of the partner robot movement destination position.

In the cases 2-1 to 2-3, as is obvious from FIGS. 9 to 11, the own robot current position<the own robot next command value, and the second difference, which is the own robot current position−the own robot next command value, is smaller than the second predetermined value. Therefore, since there is a possibility that own robot 40*a* and the partner robot 40*b* collide with each other, control device 50 determines "NO" in Step S106. In addition, since own robot 40*a* is located on the entrance side, control device 50 determines "YES" in Step S108.

In addition, in the cases 2-1 to 2-3, as is obvious from FIGS. 9 to 11, the partner robot movement destination position>the own robot next command value, the first difference, which is the partner robot movement destination position−the own robot next command value, is larger than the first predetermined value, the partner robot current position>the own robot next command value, and the third difference, which is the partner robot current position−the own robot next command value, is larger than the third predetermined value (accessible distance). Therefore, since there is no possibility that own robot 40*a* and partner robot 40*b* collide with each other, control device 50 determines "YES" in Steps S110 and S112, respectively, and can determine (movement OK determination) that own robot 40*a* can be moved by the movement control instruction.

(Case 2-4: When Own Robot Moves in + Direction of X-Axis (Toward Partner Robot) from the Current Position but Moves within Range that May Come into Contact with Partner Robot)

Figure 12:
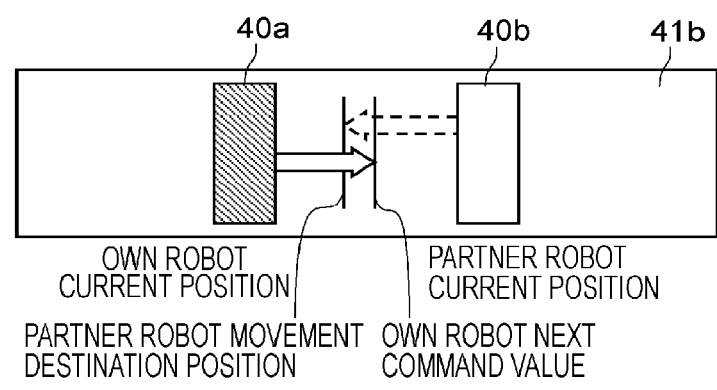
FIG. 12 is a schematic diagram illustrating case 2-4 related to the operations of first robot (own robot) 40*a* and the second robot (partner robot).

As illustrated in FIG. 12, the case 2-4 is a case where own robot 40*a* is located on the entrance side and partner robot 40*b* is located on the exit side, and a case where partner robot 40*b* moves in the − direction of the X-axis, own robot 40*a* moves in the + direction (toward the partner robot) from the current position, and the own robot next command value is located on the right side (on the exit side) of the partner robot movement destination position.

In the case 2-4, as is obvious from FIG. 12, the own robot current position<the own robot next command value, and the second difference, which is the own robot current position−the own robot next command value, is smaller than the second predetermined value. Therefore, since there is a possibility that own robot 40*a* and the partner robot 40*b* collide with each other, control device 50 determines "NO" in Step S106. In addition, since own robot 40*a* is located on the entrance side, control device 50 determines "YES" in Step S108.

Further, in the case 2-4, as is obvious from FIG. 12, the partner robot movement destination position<the own robot next command value, and the first difference, which is the partner robot movement destination position−the own robot next command value, is smaller than the first predetermined value. Therefore, since there is a possibility that own robot 40*a* and partner robot 40*b* collide with each other, control device 50 determines "NO" in Step S110, and can determine (movement NG (waiting) determination) that own robot 40*a* cannot be moved by the movement control instruction.

(Cases 3-1 to 3-3: When Own Robot Moves in + Direction of X-Axis (Toward the Partner Robot) from the Current Position and Moves within Range that May Come into Contact with Partner Robot)

Figure 13:
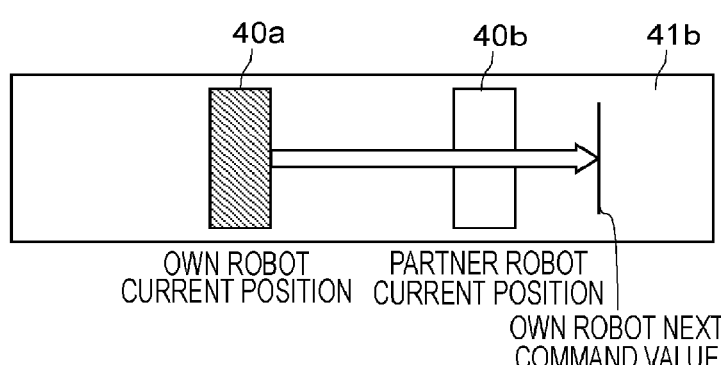
FIG. 13 is a schematic diagram illustrating case 3-1 related to the operations of first robot (own robot) 40*a* and the second robot (partner robot).
Figure 14:
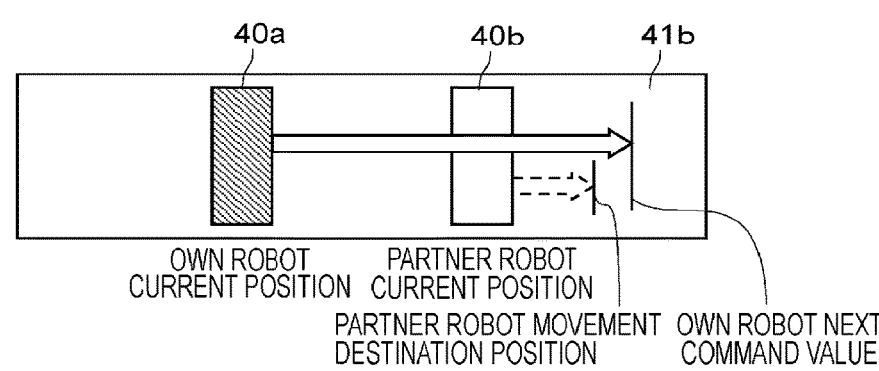
FIG. 14 is a schematic diagram illustrating case 3-2 related to the operations of first robot (own robot) 40*a* and the second robot (partner robot).
Figure 15:
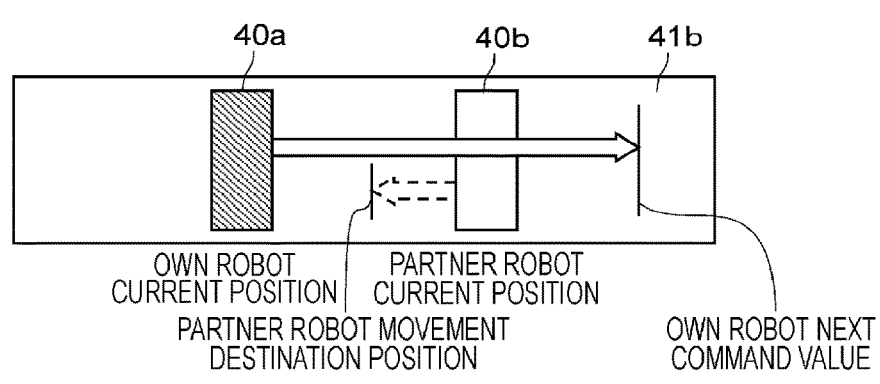
FIG. 15 is a schematic diagram illustrating case 3-3 related to the operations of first robot (own robot) 40*a* and the second robot (partner robot).

As illustrated in FIG. 13, the case 3-1 is a case where own robot 40*a* is located on the entrance side and partner robot 40*b* is located on the exit side, and a case where partner robot 40*b* stops, own robot 40*a* moves in the + direction (toward the partner robot) from the current position, and the own robot next command value is located on the right side (on the exit side) of partner robot 40*b* (partner robot movement destination position) that is stopped. As illustrated in FIGS. 14 and 15, the cases 3-2 and 3-3 are cases where own robot 40*a* is located on the entrance side and partner robot 40*b* is located on the exit side, and cases where partner robot 40*b* moves in the + direction or the − direction of the X-axis, own robot 40*a* moves in the + direction (toward the partner robot) from the current position, and the own robot next command value is located on the right side (on the exit side) of the partner robot movement destination position.

In the cases 3-1 to 3-3, as is obvious from FIGS. 13 to 15, the own robot current position<the own robot next command value, and the second difference, which is the own robot current position−the own robot next command value, is smaller than the second predetermined value. Therefore, since there is a possibility that own robot 40*a* and the partner robot 40*b* collide with each other, control device 50 determines "NO" in Step S106. In addition, since own robot 40*a* is located on the entrance side, control device 50 determines "YES" in Step S108.

Further, in the cases 3-1 to 3-3, as is obvious from FIGS. 13 to 15, the partner robot movement destination position<the own robot next command value, and the first difference, which is the partner robot movement destination position−the own robot next command value, is smaller than the first predetermined value. Therefore, since there is a possibility that own robot 40*a* and partner robot 40*b* collide with each other, control device 50 determines "NO" in Step S110, and can determine (movement NG (waiting) determination) that own robot 40*a* cannot be moved by the movement control instruction.

(Case 3-4: When Own Robot Moves in + Direction of X-Axis from Current Position (Toward the Partner Robot), and Partner Robot Moves in + Direction of X-Axis from Current Position, but Both Robots Move within Range that does not Come into Contact with Each Other.)

As illustrated in FIG. 16, the case 3-4 is a case where own robot 40*a* is located on the entrance side and partner robot 40*b* is located on the exit side, and a case where partner robot 40*b* moves in the + direction of the X-axis, own robot 40*a* also moves in the + direction from the current position (toward the partner robot), and the own robot next command value is located on the left side (on the entrance side) of the partner robot movement destination position.

In the case 3-4, as is obvious from FIG. 16, the own robot current position<the own robot next command value, and the second difference, which is the own robot current position−the own robot next command value, is smaller than the second predetermined value. Therefore, since there is a possibility that own robot 40*a* and the partner robot 40*b* collide with each other, control device 50 determines "NO" in Step S106. In addition, since own robot 40*a* is located on the entrance side, control device 50 determines "YES" in Step S108.

Further, in the case 3-4, as is obvious from FIG. 16, the partner robot movement destination position>the own robot next command value, the first difference, which is the partner robot movement destination position–the own robot next command value, is larger than the first predetermined value, the partner robot current position<the own robot next command value, the third difference, which is the partner robot current position–the own robot next command value, is smaller than the third predetermined value (accessible distance), and the fourth difference, which is the partner robot current position–the own robot current position, is larger than the fourth predetermined value (followable distance). Therefore, since there is no possibility that own robot 40a and partner robot 40b collide with each other, control device 50 determines "YES", "NO", and "YES" in Steps S110, 112, and 114, respectively, and can determine (movement OK determination) that own robot 40a can be moved by the movement control instruction.

Functions and Advantageous Effects of Present Embodiment

The workpiece processing apparatus (machine tool 10) according to the above-described embodiment is a workpiece processing apparatus including two workpiece conveyance robots 40a and 40b capable of traveling on same guide section (traveling table) 41b and carrying workpiece W into and out of processing sections 35a and 35b, and control device for performing the movement control of workpiece conveyance robots 40a and 40b. Two workpiece conveyance robots 40a and 40b include first robot 40a and second robot 40b. Control device 50 determines, from the first difference between the first robot next instruction value (own robot next command value) which is the instruction value related to the movement control instruction issued to first robot 40a immediately after the time when the determination as to whether first robot 40a starts the traveling starts and indicates the movement destination position of first robot 40a and the second robot movement destination position (partner robot movement destination position) which is the value related to the movement control instruction executed by second robot 40b at the time when the determination starts and indicates the movement destination position of second robot 40b, the movability of first robot 40a by the movement control instruction (first determination section: Step S110).

According to the present embodiment, at the time when the determination regarding the movability is made, by using the first difference between the movement destination position (partner robot movement destination position) of second robot 40b by the movement control instruction executed at that time and the movement destination position (own robot next command value) of first robot 40a by the movement control instruction (the movement control instruction that will be executed at the highest speed (shortest) at that time) executed next to the movement control instruction executed at that time, it is possible to more precisely and accurately determine the movability of first robot 40a. In addition, it is possible to appropriately perform the movement control of first robot 40a based on the determination result, and as a result, it is possible to further suppress collision between robots 40a and 40b installed on same guide section 41b.

In addition, control device 50 (the first determination section) further considers the second difference between the first robot next instruction value (the own robot next command value) and the current position (the own robot current position) of first robot 40a at the time when the determination starts to determine the movability of first robot 40a by the movement control instruction (Step S106).

According to this configuration, by additionally using the second difference between the first robot next instruction value and the current position of first robot 40a at the time when the determination starts, it is possible to determine the movability of first robot 40a by the movement control instruction. Therefore, since it is possible to more precisely and accurately determine the movability of first robot 40a, it is possible to further suppress the collision between robots 40a and 40b installed on same guide section 41b.

In addition, control device 50 (the first determination section) further considers the third difference between the first robot next instruction value (the own robot next command value) and the current position (the partner robot current position) of second robot 40b at the time when the determination starts to determine the movability of first robot 40a by the movement control instruction (Step S112).

According to this, by additionally using the third difference between the first robot next instruction value and the current position of second robot 40b at the time when the determination starts, it is possible to determine the movability of first robot 40a by the movement control instruction. Therefore, since it is possible to more precisely and accurately determine the movability of first robot 40a, it is possible to further suppress the collision between robots 40a and 40b installed on same guide section 41b.

In addition, control device 50 (first determination section) further considers the fourth difference between the current position (the own robot current position) of first robot 40a at the time when the determination starts and the current position (the partner robot current position) of second robot 40b at the time when the determination starts to determine the movability of first robot 40a by the movement control instruction (Step S114).

According to this, by additionally using the fourth difference between the current position of first robot 40a at the time when the determination starts and the current position of second robot 40b at the time when the determination starts, it is possible to determine the movability of first robot 40a by the movement control instruction. Therefore, since it is possible to more precisely and accurately determine the movability of first robot 40a, it is possible to further suppress the collision between robots 40a and 40b installed on same guide section 41b.

Control device 50 includes a second determination section (Step S108) configured to determine whether the determination by the first determination section is continued or stopped, depending on whether the determination as to the movability of first robot 40a is prioritized over the determination as to the movability of second robot 40b.

According to this configuration, it is possible to appropriately determine whether to continue or stop the determination by the first determination section depending on whether there is the priority between the determination as to the movability of first robot 40a and the determination as to the movability of second robot 40b. Therefore, since it is possible to more precisely and accurately determine the movability of first robot 40a, it is possible to further suppress the collision between robots 40a and 40b installed on same guide section 41b.

REFERENCE SIGNS LIST

10: machine tool (workpiece processing apparatus), 35a, 35b: processing section, 40a, robot (workpiece conveyance robot), 40a: first robot, 40b: second robot, 41b: guide section (traveling table), 50: control device (first determination section: Step S110, Step S106, Step S112, Step S114), 50: control device (second determination section: Step S108), W: workpiece

The invention claimed is:

1. A workpiece processing apparatus comprising:
two workpiece conveyance robots configured to travel on the same traveling table and carry a workpiece into and out of a processing section; and
a control device configured to perform movement control of the workpiece conveyance robot,
wherein the two workpiece conveyance robots include a first robot and a second robot, and
the control device includes a first determination section configured to:
    determine, prior to executing a movement control instruction for the first robot, whether the first robot is permitted to move, based on a first difference between:
        a first robot next instruction value, which is an instruction value indicating a movement destination position of the first robot associated with a movement control instruction issued to the first robot immediately after a determination start time, and
        a second robot movement destination position, which is a value associated with a movement control instruction already being executed by the second robot at the determination start time and indicating a movement destination position of the second robot,
    determine a movability of the first robot by the movement control instruction based on whether the first difference is greater than a predetermined threshold distance, and when the movability is determined to be permitted, control the first robot to move to the movement destination position based on the movement control instruction,
    wherein the predetermined threshold distance is set based on a difference between a current position of the first robot and the first robot next instruction value.

2. The workpiece processing apparatus according to claim 1, wherein the first determination section further considers a second difference between the first robot next instruction value and the current position of the first robot at the time when the determination starts to determine the movability of the first robot by the movement control instruction.

3. The workpiece processing apparatus according to claim 1, wherein the first determination section further considers a third difference between the first robot next instruction value and the current position of the second robot at the time when the determination starts to determine the movability of the first robot by the movement control instruction.

4. The workpiece processing apparatus according to claim 3, wherein the first determination section further considers a fourth difference between the current position of the first robot at the time when the determination starts and the current position of the second robot at the time when the determination starts to determine the movability of the first robot by the movement control instruction.

5. The workpiece processing apparatus according to claim 1, wherein the control device includes a second determination section configured to determine whether the determination by the first determination section is continued or stopped depending on whether the determination as to the movability of the first robot is prioritized over determination as to movability of the second robot.

* * * * *